US010252669B2

United States Patent
Miura et al.

(10) Patent No.: US 10,252,669 B2
(45) Date of Patent: *Apr. 9, 2019

(54) WARNING DEVICE GENERATING WARNING VIBRATION WAVE FOR VEHICLE WITH TORQUE DETECTOR

(71) Applicant: JTEKT CORPORATION, Osaka-shi, Osaka (JP)

(72) Inventors: Yuichi Miura, Kariya (JP); Yuji Kariatsumari, Kitakatsuragi-gun (JP); Kohei Moriki, Okazaki (JP)

(73) Assignee: JTEKT CORPORATION, Osaka-shi (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/975,139

(22) Filed: May 9, 2018

(65) Prior Publication Data

US 2018/0257562 A1  Sep. 13, 2018

Related U.S. Application Data

(62) Division of application No. 15/427,142, filed on Feb. 8, 2017.

(30) Foreign Application Priority Data

Feb. 15, 2016  (JP) .................. 2016-026110

(51) Int. Cl.
*G08B 21/00* (2006.01)
*B60Q 9/00* (2006.01)
(Continued)

(52) U.S. Cl.
CPC ............... *B60Q 9/00* (2013.01); *B60W 10/20* (2013.01); *B60W 30/12* (2013.01); *B60W 50/16* (2013.01); *B62D 15/029* (2013.01)

(58) Field of Classification Search
CPC ....................................................... B60Q 9/00
(Continued)

(56) References Cited

U.S. PATENT DOCUMENTS 5,667,033 A  9/1997 Shimizu et al.
6,389,332 B1  5/2002 Hess et al.
(Continued)

FOREIGN PATENT DOCUMENTS

DE  10 2005 048542 A1  4/2007
EP       1 733 950 A1  12/2006
(Continued)

OTHER PUBLICATIONS

Jun. 26, 2018 Office Action issued in U.S. Appl. No. 15/427,142.
(Continued)

*Primary Examiner* — Mark S Rushing
(74) *Attorney, Agent, or Firm* — Oliff PLC

(57) ABSTRACT

A warning device for a vehicle includes a warning vibration wave generator and a vibration applying device. For each of a plurality of vehicle conditions, the warning vibration wave generator generates a warning vibration wave having a frequency that varies with the vehicle speed detected by a vehicle speed sensor, and that differs for each vehicle condition at the same vehicle speed. Based on the warning vibration wave generated by the warning vibration wave generator, the vibration applying device applies a warning vibration corresponding to the warning vibration wave to a steering member.

2 Claims, 6 Drawing Sheets

(51) Int. Cl.
  *B60W 50/16* (2012.01)
  *B62D 15/02* (2006.01)
  *B60W 10/20* (2006.01)
  *B60W 30/12* (2006.01)

(58) Field of Classification Search
  USPC .......................................................... 340/441
  See application file for complete search history.

(56) References Cited

U.S. PATENT DOCUMENTS

| | | |
|---|---|---|
| 2007/0008083 A1 | 1/2007 | Berg et al. |
| 2009/0273458 A1 | 11/2009 | Almqvist et al. |
| 2012/0062375 A1 | 3/2012 | Takeuchi et al. |
| 2012/0081234 A1* | 4/2012 | Shaffer .................. G08G 1/167 |
| | | 340/905 |
| 2014/0218213 A1 | 8/2014 | Schneider et al. |

FOREIGN PATENT DOCUMENTS

| | | |
|---|---|---|
| EP | 2 865 577 A2 | 4/2015 |
| JP | H11-34774 A | 2/1999 |
| JP | 4292562 B2 | 7/2009 |
| WO | 2007/136338 A1 | 11/2007 |

OTHER PUBLICATIONS

Jul. 7, 2017 extended Search Report issued in European Patent Application No. 17155437.1.
Feb. 14, 2018 Restriction Requirement issued in U.S. Appl. No. 15/427,142.
Dec. 14, 2018 Office Action issued in U.S. Appl. No. 15/427,142.

* cited by examiner

WARNING DEVICE GENERATING WARNING VIBRATION WAVE FOR VEHICLE WITH TORQUE DETECTOR

CROSS-REFERENCE TO RELATED APPLICATION

This application is a divisional of U.S. patent application Ser. No. 15/427,142 filed Feb. 8, 2017, which claims the benefit of Japanese Patent Application No. 2016-026110 filed Feb. 15, 2016. The disclosure of the prior applications is hereby incorporated by reference in their entirety.

BACKGROUND OF THE INVENTION

1. Field of the Invention

The present invention relates to a warning device for a vehicle that issues a warning based on vehicle conditions.

2. Description of Related Art

Vehicles are known that have steering assist control functions such as a lane keeping assist function of assisting a driver in performing a steering operation and a lane changing assist function of assisting a driver in changing lanes in order to facilitate traveling of a vehicle along a traveling path. For the purpose of informing a driver of an undesired vehicle condition during the execution of steering assist control, a warning device for a vehicle, which vibrates a steering wheel as a steering member to warn the driver, has been developed. For example, see Japanese Patent No. 4292562 (JP 4292562 B) and Japanese Patent Application Publication No. 11-34774 (JP 11-34774 A).

Under a plurality of vehicle conditions about which a driver needs to be warned, it is considered that a warning vibration is generated to be applied to a steering wheel when these vehicle conditions have arisen. In this case, for example, when a plurality of undesired vehicle conditions have simultaneously arisen, it is preferable to notify the driver that these vehicle conditions have simultaneously arisen.

SUMMARY OF THE INVENTION

It is an object of the present invention to provide a warning device for a vehicle that, when a plurality of vehicle conditions about which a driver needs to be warned have simultaneously arisen, allows the driver to know that a plurality of vehicle conditions have simultaneously arisen with warning vibrations applied to a steering member.

A warning device for a vehicle according to one aspect of the present invention include: a vehicle speed detector that detects a vehicle speed; a vibration wave generator that generates, for each of a plurality of vehicle conditions determined in advance, a warning vibration wave having a frequency that varies with the vehicle speed detected by the vehicle speed detector, the frequency at an identical vehicle speed being different for each vehicle condition; and a vibration applying device that applies a warning vibration corresponding to the warning vibration wave to a steering member, based on the warning vibration wave generated by the vibration wave generator.

In the warning device for a vehicle according to the above aspect, when a plurality of vehicle conditions have simultaneously arisen, a plurality of warning vibration waves corresponding to each of the vehicle conditions having simultaneously arisen are generated. The warning vibration waves corresponding to each of the vehicle conditions each have a frequency that varies with the vehicle speed, and the frequency for the identical vehicle speed is different for each vehicle condition. Based on these warning vibration waves, warning vibrations corresponding to the warning vibration waves are applied to the steering member. Thus, when a plurality of vehicle conditions have simultaneously arisen, the driver can be notified that a plurality of vehicle conditions have simultaneously arisen with the warning vibrations.

A warning device for a vehicle according to another aspect of the present invention includes: an electric motor that applies steering assisting force to a steering operation mechanism of a vehicle; a vehicle speed detector that detects a vehicle speed; a torque detector that detects a steering torque; a basic assist current value setting unit that sets a basic assist current value based on the steering torque detected by the torque detector; a vibration wave generator that generates, for each of a plurality of vehicle conditions, a warning vibration wave having a frequency that varies with the vehicle speed detected by the vehicle speed detector, the frequency at an identical vehicle speed being different for each vehicle condition; a target current value computing unit that computes a target current value for the electric motor by adding the warning vibration wave generated by the vibration wave generator to the basic assist current value set by the basic assist current value setting unit; and a motor controller that controls the electric motor based on the target current value computed by the target current value computing unit.

In the warning device for a vehicle according to the above aspect, when a plurality of vehicle conditions have simultaneously arisen, a plurality of warning vibration waves corresponding to each of the vehicle conditions having simultaneously arisen are generated. The warning vibration waves corresponding to each of the vehicle conditions each have a frequency that varies with the vehicle speed, and the frequency at the identical vehicle speed is different for each vehicle condition. By adding these warning vibration waves to the basic assist current value, target current values for the electric motor are computed. The electric motor is controlled based on the target current values. Thus, when a plurality of vehicle conditions have simultaneously arisen, the driver can be notified that the plurality of vehicle conditions have simultaneously arisen with the warning vibrations.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Embodiments of the present invention will now be described in detail with reference to the attached drawings.

Figure 1:
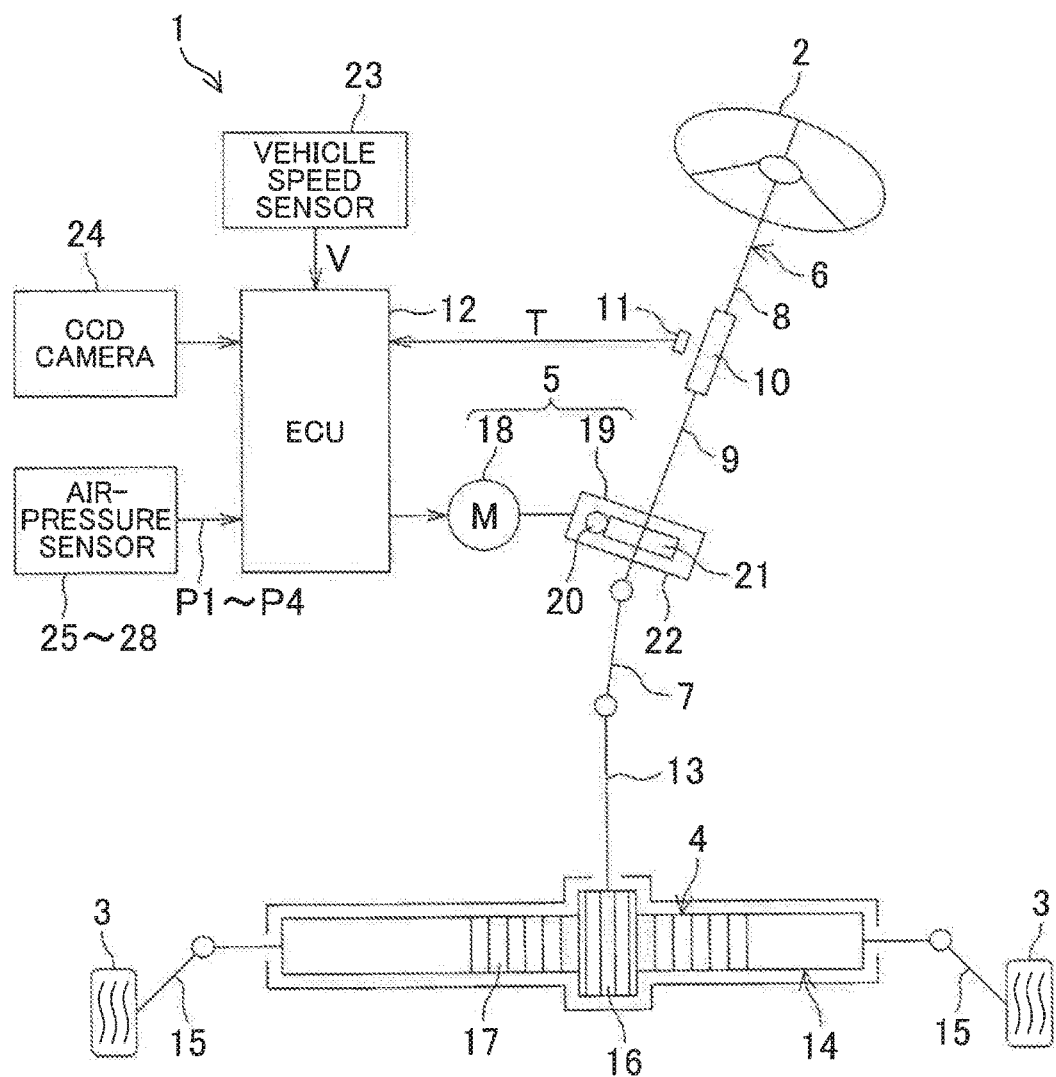
FIG. 1 is a schematic diagram illustrating a schematic configuration of an electric power steering system in which a warning device for a vehicle according to an embodiment of the present invention is used.

FIG. 1 is a schematic diagram illustrating a schematic configuration of an electric power steering system in which a warning device for a vehicle according to an embodiment of the present invention is used.

An electric power steering (EPS) system 1 includes a steering wheel 2 as a steering member used to steer a vehicle, a steering operation mechanism 4 that steers steered wheels 3 in response to the rotation of the steering wheel 2, and a steering assist mechanism 5 that assists a driver in performing a steering operation. The steering wheel 2 and the steering operation mechanism 4 are mechanically connected to each other via a steering shaft 6 and an intermediate shaft 7. Herein, the present invention can be applied to a steer-by-wire electric power steering system in which the steering wheel 2 is not mechanically connected to the steering operation mechanism 4.

The steering shaft 6 includes an input shaft 8 coupled to the steering wheel 2 and an output shaft 9 coupled to the intermediate shaft 7. The input shaft 8 and the output shaft 9 are connected to each other via a torsion bar 10 so as to be rotatable relative to each other.

Near the torsion bar 10, a torque sensor 11 is disposed. The torque sensor 11 detects a steering torque T applied to the steering wheel 2, based on the relative rotation displacement between the input shaft 8 and the output shaft 9. In the present embodiment, the steering torque T is detected by the torque sensor 11 such that, for example, a torque for steering the vehicle to the right is detected as a positive value and a torque for steering the vehicle to the left is detected as a negative value. Thus, the magnitude of the steering torque increases as the absolute value of the detected steering torque increases.

The steering operation mechanism 4 is a rack-and-pinion mechanism including a pinion shaft 13 and a rack shaft 14 serving as a steered shaft. Each end of the rack shaft 14 is connected to the corresponding steered wheel 3 via a tie rod 15 and a knuckle arm (not depicted). The pinion shaft 13 is connected to the intermediate shaft 7. The pinion shaft 13 is configured to rotate in response to a steering operation of the steering wheel 2. A distal end (lower end in FIG. 1) of the pinion shaft 13 is connected to a pinion 16.

The rack shaft 14 linearly extends along the lateral direction of the vehicle. In an intermediate portion of the rack shaft 14 in the axial direction, a rack 17 that meshes with the pinion 16 is formed. The pinion 16 and the rack 17 convert the rotation of the pinion shaft 13 into an axial motion of the rack shaft 14. The axial motion of the rack shaft 14 allows the steered wheels 3 to be steered.

When the steering wheel 2 is steered (rotated), this rotation is transmitted to the pinion shaft 13 through the steering shaft 6 and the intermediate shaft 7. The rotation of the pinion shaft 13 is converted into the axial motion of the rack shaft 14 by the pinion 16 and the rack 17. Consequently, the steered wheels 3 are steered.

The steering assist mechanism 5 includes an electric motor (EPS electric motor) 18 that assists steering and a speed reducer 19 that transmits the torque output by the electric motor 18 to the steering operation mechanism 4. The speed reducer 19 is a worm gear mechanism including a worm shaft 20 and a worm wheel 21 that meshes with the worm shaft 20. The speed reducer 19 is housed in a gear housing 22 serving as a transmitting mechanism housing.

The worm shaft 20 is driven to be rotated by the electric motor 18. The worm wheel 21 is connected to the steering shaft 6 so as to be rotatable in the same direction as the rotation direction of the steering shaft 6. The worm wheel 21 is driven to be rotated by the worm shaft 20.

When the worm shaft 20 is driven to be rotated by the electric motor 18, the worm wheel 21 is driven to be rotated, and thus the steering shaft 6 rotates. The rotation of the steering shaft 6 is transmitted to the pinion shaft 13 through the intermediate shaft 7. The rotation of the pinion shaft 13 is converted into an axial motion of the rack shaft 14. Thus, the steered wheels 3 are steered. That is, the worm shaft 20 is driven to be rotated by the electric motor 18, whereby the steered wheels 3 are steered.

In the vehicle, a vehicle speed sensor 23 that detects a vehicle speed V is provided, and a charge-coupled device (CCD) camera 24 that captures an image of a road ahead of the vehicle in the traveling direction is mounted. The CCD camera 24 is provided to monitor the operating state of the vehicle. Wheels of the vehicle are each provided with air-pressure sensors 25, 26, 27, and 28 that detect air pressures of the corresponding tires.

The steering torque T detected by the torque sensor 11, the vehicle speed V detected by the vehicle speed sensor 23, air pressures P1, P2, P3, and P4 detected by the respective air-pressure sensors 25, 26, 27, and 28, and an image signal output by the CCD camera 24 are input into an electronic control unit (ECU) 12. The ECU 12 controls the electric motor 18 based on these input signals.

Figure 2:
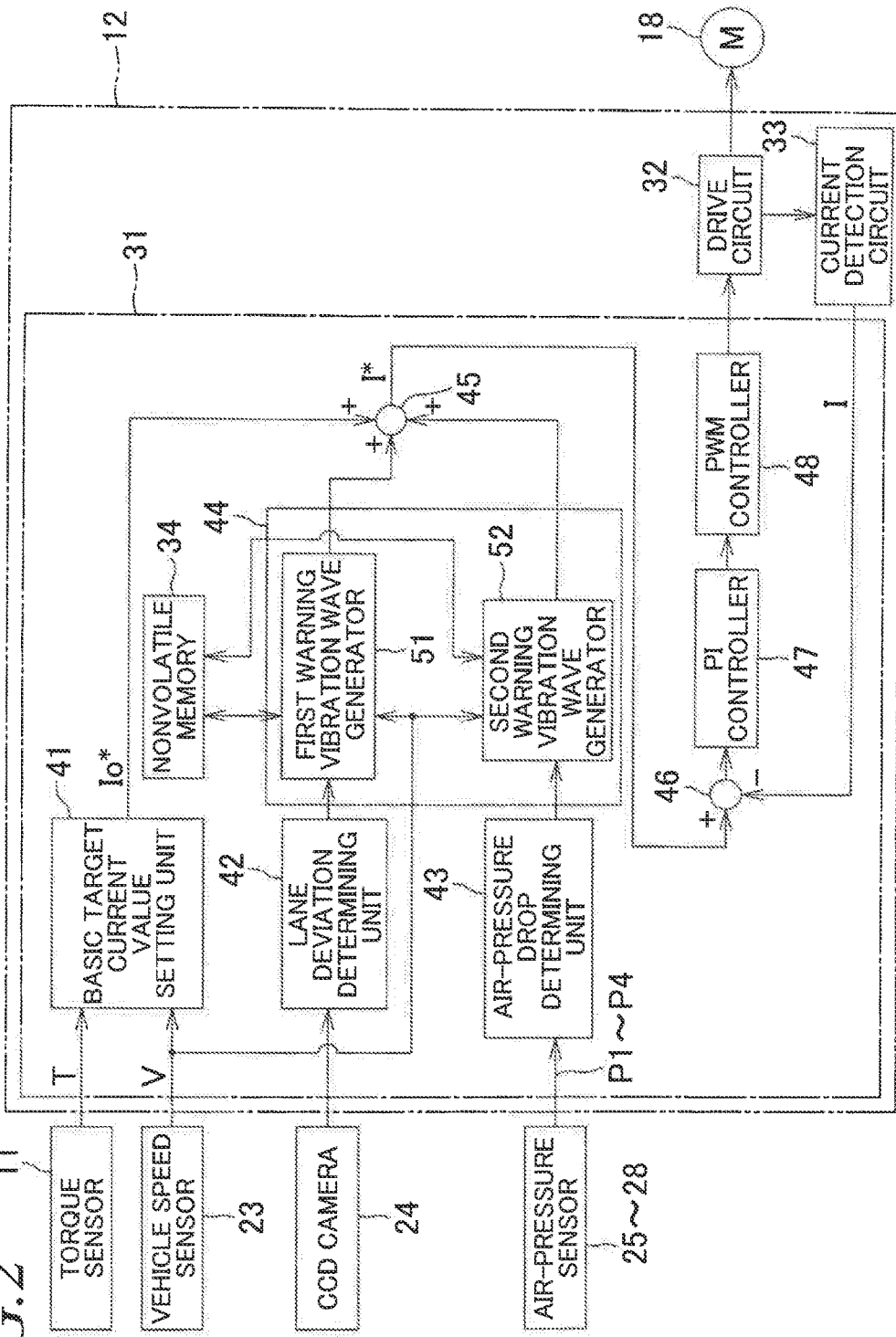
FIG. 2 is a block diagram illustrating an electrical configuration of an ECU.

FIG. 2 is a block diagram illustrating an electrical configuration of the ECU 12.

The ECU 12 includes a microcomputer 31 that controls the electric motor 18, a drive circuit (inverter circuit) 32 that is controlled by the microcomputer 31 to supply electric power to the electric motor 18, and a current detection circuit 33 that detects a motor current (actual current value) I flowing through the electric motor 18.

The microcomputer 31 includes a CPU and memories (e.g., a ROM, a RAM, and a nonvolatile memory 34), and executes predetermined programs to function as a plurality of function processing units. These function processing units include a basic target current value setting unit 41, a lane deviation determining unit 42, an air-pressure drop determining unit 43, a warning vibration wave generator 44, a vibration wave adding unit 45, a current deviation computing unit 46, a PI controller 47, and a PWM controller 48.

Figure 3:
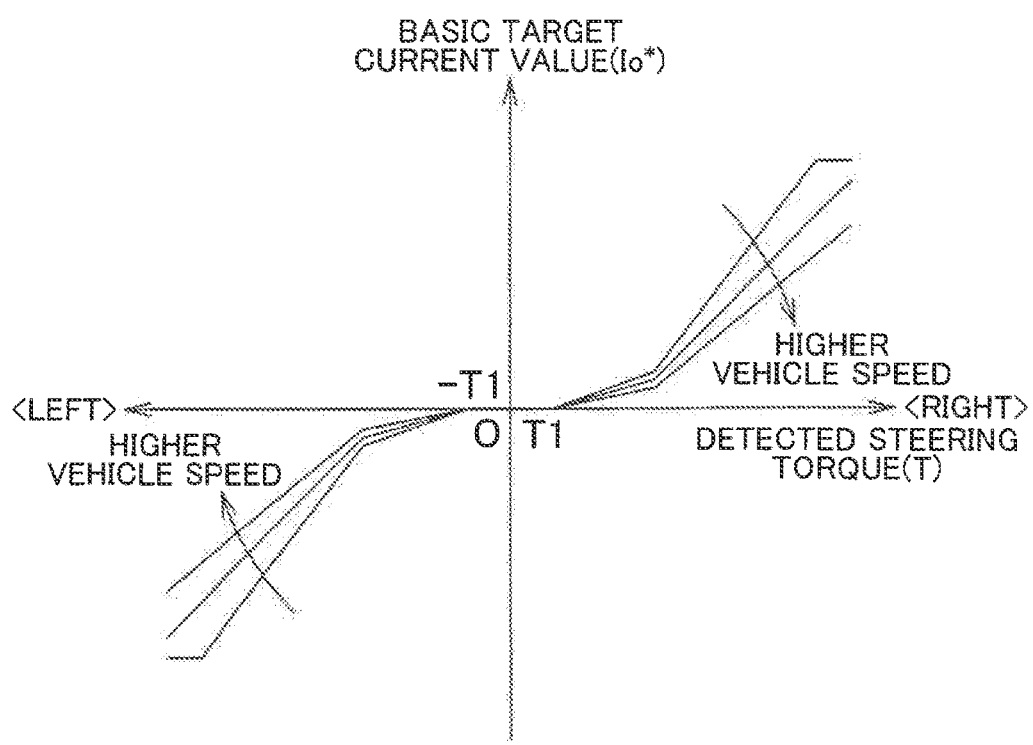
FIG. 3 is a graph illustrating an example of the manner of setting a basic target current value $I_o^*$ with respect to a detected steering torque T.

The basic target current value setting unit 41 sets a basic target current value Io* based on the steering torque T detected by the torque sensor 11 and the vehicle speed V detected by the vehicle speed sensor 23. An example of the manner of setting the basic target current value Io* with respect to the detected steering torque T is illustrated in FIG. 3. In the detected steering torque T, for example, the torque for steering the vehicle to the right takes a positive value, and the torque for steering the vehicle to the left takes a negative value. The basic target current value Io* is set as a positive value when the steering assisting force for steering the vehicle to the right needs to be generated by the electric motor 18, and is set as a negative value when the steering assisting force for steering the vehicle to the left needs to be generated by the electric motor 18.

The basic target current value Io* takes a positive value when the detected steering torque T is a positive value, and takes a negative value when the detected steering torque T is a negative value. When the detected steering torque T is a significantly low value within a range from −T1 to T1 (e.g., T1=0.4 N·m) (torque dead zone), the basic target current value Io* is set to zero. When the detected steering torque T is a value outside the range from −T1 to T1, the basic target current value Io* is set such that the absolute value increases as the absolute value of the detected steering torque T increases. Furthermore, the basic target current value Io* is set such that the absolute value decreases as the vehicle speed V detected by the vehicle speed sensor 23 increases. By these settings, a larger steering assisting force can be generated in low-speed traveling, and a smaller steering assisting force can be generated in high-speed traveling.

Based on the image captured by the CCD camera 24, the lane deviation determining unit 42 determines whether the vehicle is highly likely to deviate from the lane, and provides the determination result to the warning vibration wave generator 44. The technique of capturing an image of a road ahead of the vehicle in the traveling direction and determining whether the vehicle is highly likely to deviate from the lane is known as described in, for example, JP 4292562 B and JP 11-34774 A, and thus description thereof is omitted.

Based on the air pressures P1 to P4 of the tires respectively detected by the air-pressure sensors 25 to 28, the air-pressure drop determining unit 43 determines whether the air pressure of at least one tire is lower than a predetermined threshold A, and provides the determination result to the warning vibration wave generator 44.

The warning vibration wave generator 44 includes a first warning vibration wave generator 51 and a second warning vibration wave generator 52. The first warning vibration wave generator 51 receives the determination result from the lane deviation determining unit 42. When the lane deviation determining unit 42 determines that the vehicle is highly likely to deviate from the lane, the first warning vibration wave generator 51 generates a first warning vibration wave (excitation signal) Ie1 to warn the driver about this likelihood. The first warning vibration wave Ie1 is a wave having a frequency that varies with the vehicle speed V detected by the vehicle speed sensor 23. In the present embodiment, the first warning vibration wave Ie1 is a sinusoidal signal having a frequency that varies with the vehicle speed V. Herein, the first warning vibration wave Ie1 may be a wave other than the sinusoidal signal having a frequency that varies with the vehicle speed V, such as a triangular wave, a rectangular wave, or a wave obtained by combining a triangular wave with a rectangular wave.

The second warning vibration wave generator 52 receives the determination result from the air-pressure drop determining unit 43. When the air-pressure drop determining unit 43 determines that the air pressure of at least one tire is lower than the threshold A, the second warning vibration wave generator 52 generates a second warning vibration wave (excitation signal) Ie2 having a frequency that is different from that of the first warning vibration wave Ie1 to warn the driver about this air pressure. The second warning vibration wave Ie2 is a wave having a frequency that varies with the vehicle speed V detected by the vehicle speed sensor 23. In the present embodiment, like the first warning vibration wave Ie1, the second warning vibration wave Ie2 is a sinusoidal signal having a frequency that varies with the vehicle speed V. However, the frequency f2(V) of the second warning vibration wave Ie2 is set such that the frequency f2(V) of the second warning vibration wave Ie2 for a certain vehicle speed V is different from the frequency f1(V) of the first warning vibration wave Ie1 for this vehicle speed V. Herein, the second warning vibration wave Ie2 may be a wave other than the sinusoidal signal having a frequency that varies with the vehicle speed V, such as a triangular wave, a rectangular wave, or a wave obtained by combining a triangular wave with a rectangular wave.

Figure 4A:
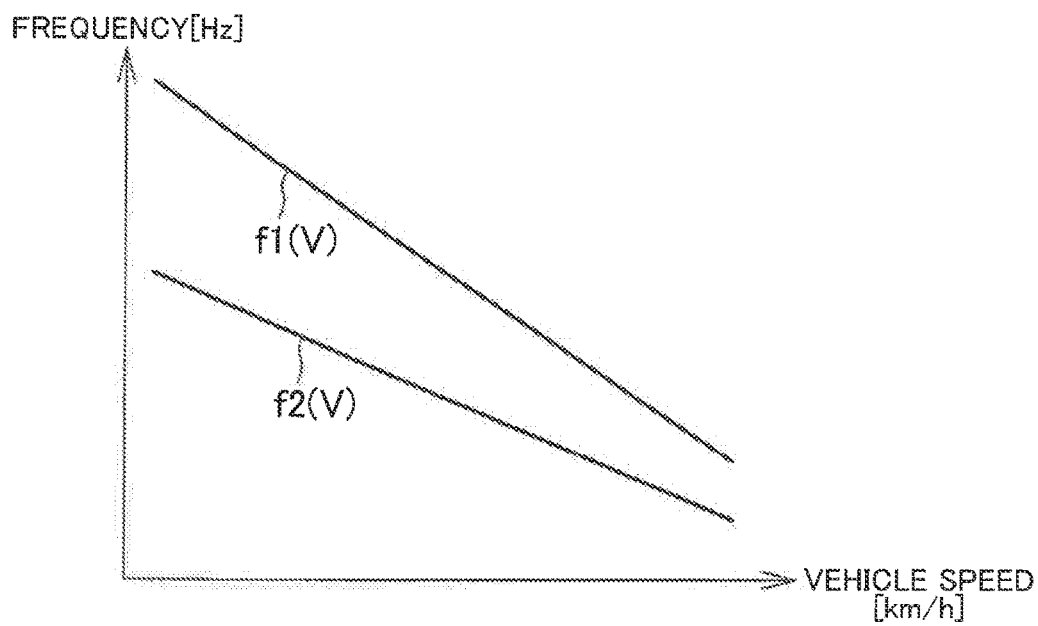
FIG. 4A is a graph illustrating an example of the manner of setting a frequency $f1(V)$ of a first warning vibration wave Ie1 with respect to a vehicle speed and a frequency f2(V) of a second warning vibration wave Ie2 with respect to the vehicle speed.

FIG. 4A illustrates an example of the manner of setting the frequency f1(V) (hereinafter also called "first frequency f1(V)") of the first warning vibration wave Ie1 with respect to the vehicle speed V and the frequency f2(V) (hereinafter also called "second frequency f2(V)") of the second warning vibration wave Ie2 with respect to the vehicle speed V.

Figure 5:
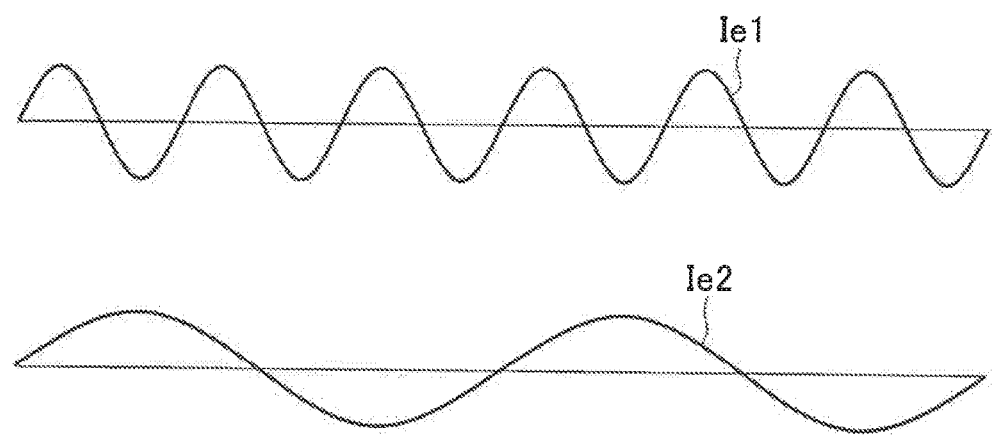
FIG. 5 is a waveform diagram illustrating an example of the first warning vibration wave Ie1 and the second warning vibration wave Ie2.

In the example in FIG. 4A, the first frequency f1(V) and the second frequency f2(V) are set such that the frequencies become lower as the vehicle speed V increases. In this example, this setting is made such that the first frequency f1(V) is higher than the second frequency f2(V) at the same vehicle speed V. The setting is also made such that the difference between the first frequency f1(V) and the second frequency f2(V) increases as the vehicle speed V decreases. This is because it is more difficult to distinguish between the first frequency f1(V) and the second frequency f2(V) at higher frequencies. FIG. 5 illustrates an example of the first warning vibration wave Ie1 and the second warning vibration wave Ie2. The setting may be made such that the first frequency f1(V) is lower than the second frequency f2(V) at the same vehicle speed V.

Figure 4B:
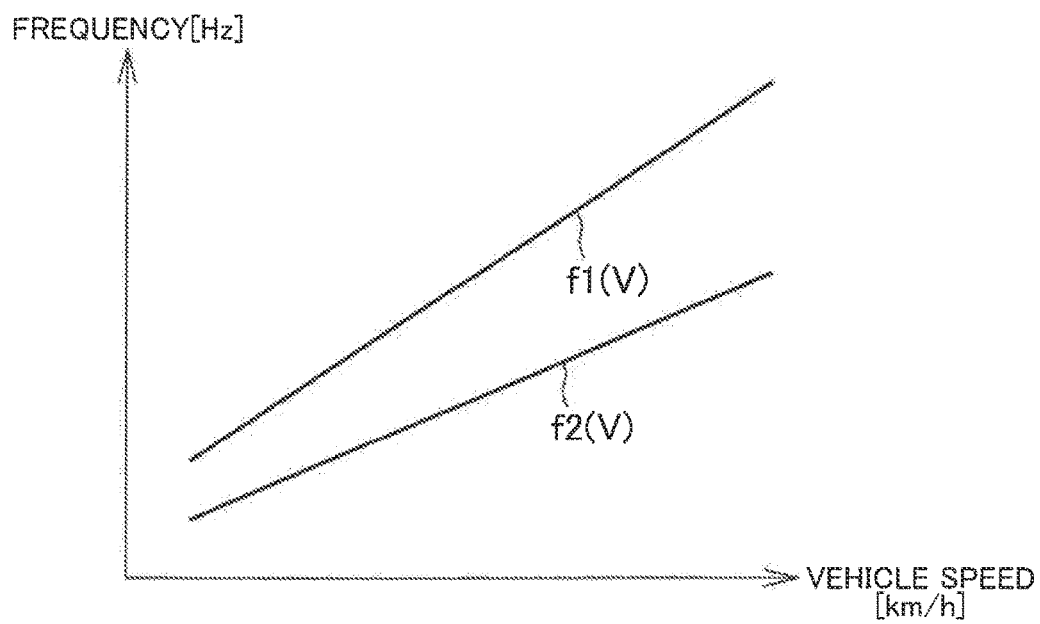
FIG. 4B is a graph illustrating another example of the manner of setting the frequency f1(V) of the first warning vibration wave Ie1 with respect to the vehicle speed and the frequency f2(V) of the second warning vibration wave Ie2 with respect to the vehicle speed.

FIG. 4B illustrates another example of the manner of setting the frequency f1(V) of the first warning vibration wave Ie1 with respect to the vehicle speed V and the frequency f2(V) of the second warning vibration wave Ie2 with respect to the vehicle speed V.

In the example in FIG. 4B, the first frequency f1(V) and the second frequency f2(V) are set such that the frequencies become higher as the vehicle speed V increases. In this example, this setting is made such that the first frequency f1(V) is higher than the second frequency f2(V) at the same vehicle speed V. The setting is also made such that the difference between the first frequency f1(V) and the second frequency f2(V) increases as the vehicle speed increases. This is because it is more difficult to distinguish between the first frequency f1(V) and the second frequency f2(V) at higher frequencies. The setting may be made such that the first frequency f1(V) is lower than the second frequency f2(V) at the same vehicle speed V.

First warning vibration wave data for each vehicle speed V and second warning vibration wave data for each vehicle speed V are, for example, created in advance, and stored in the nonvolatile memory 34. The first warning vibration wave generator 51 generates the first warning vibration wave Ie1 based on the vehicle speed V detected by the vehicle speed sensor 23 and the first warning vibration wave data stored in the nonvolatile memory 34. The second warning vibration wave generator 52 generates the second warning vibration wave Ie2 based on the vehicle speed V detected by the vehicle speed sensor 23 and the second warning vibration wave data stored in the nonvolatile memory 34.

The vibration wave adding unit 45 computes a target current value I* by adding the first warning vibration wave Ie1 generated by the first warning vibration wave generator 51 and the second warning vibration wave Ie2 generated by the second warning vibration wave generator 52 to the basic target current value Io* set by the basic target current value setting unit 41. The current deviation computing unit 46 computes a deviation between the target current value I* obtained by the vibration wave adding unit 45 and the actual current value I detected by the current detection circuit 33 (current deviation ΔI=I*−I).

By executing PI computation on the current deviation ΔI computed by the current deviation computing unit 46, the PI controller 47 generates a drive command value for adjusting the current I flowing through the electric motor 18 to the target current value I*. The PWM controller 48 generates a PWM control signal having a duty ratio that corresponds to the drive command value, and supplies this signal to the drive circuit 32. Thus, electric power corresponding to the drive command value is supplied to the electric motor 18.

The current deviation computing unit 46 and the PI controller 47 constitute a current feedback controller. By the operation of this current feedback controller, the motor current I flowing through the electric motor 18 is controlled so as to approach the target current value I*.

In the present embodiment, when the lane deviation determining unit 42 determines that the vehicle is highly likely to deviate from the lane, the first warning vibration wave generator 51 generates the first warning vibration wave Ie1. This first warning vibration wave Ie1 is added to the basic target current value Io*, whereby the target current value I* is computed. The motor current I flowing through the electric motor 18 is then controlled so as to approach the target current value I*. Thus, when the lane deviation determining unit 42 determines that the vehicle is highly likely to deviate from the lane, the warning vibration corresponding to the first warning vibration wave Ie1 is applied to the steering wheel 2. This enables the driver to recognize that the vehicle is highly likely to deviate from the lane.

When the air-pressure drop determining unit 43 determines that the air pressure of at least one tire is lower than the threshold A, the second warning vibration wave generator 52 generates the second warning vibration wave Ie2. This second warning vibration wave Ie2 is added to the basic target current value Io*, whereby the target current value I* is computed. The motor current I flowing through the electric motor 18 is then controlled so as to approach the target current value I*. Thus, when the air-pressure drop determining unit 43 determines that the air pressure of at least one tire is lower than the threshold A, the warning vibration corresponding to the second warning vibration wave Ie2 is applied to the steering wheel 2. This enables the driver to recognize that the tire air pressure is low.

When the air-pressure drop determining unit 43 determines that the air pressure of at least one tire is lower than the threshold A under the condition that the lane deviation determining unit 42 determines that the vehicle is highly likely to deviate from the lane, the first warning vibration wave Ie1 and the second warning vibration wave Ie2 are added to the basic target current value Io*, whereby the target current value I* is computed. Also when the lane deviation determining unit 42 determines that the vehicle is highly likely to deviate from the lane under the condition that the air-pressure drop determining unit 43 determines that the air pressure of at least one tire is lower than the threshold A, the first warning vibration wave Ie1 and the second warning vibration wave Ie2 are added to the basic target current value Io*, whereby the target current value I* is computed.

The motor current I flowing through the electric motor 18 is then controlled so as to approach the target current value I*. Thus, when the lane deviation determining unit 42 determines that the vehicle is highly likely to deviate from the lane and the air-pressure drop determining unit 43 determines that the air pressure of at least one tire is lower than the threshold A, the warning vibration corresponding to a wave in which the first warning vibration wave Ie1 and the second warning vibration wave Ie2 are superimposed is applied to the steering wheel 2. This enables the driver to recognize that the vehicle is highly likely to deviate from the lane and also to recognize that the tire air pressure is low.

Figure 6:
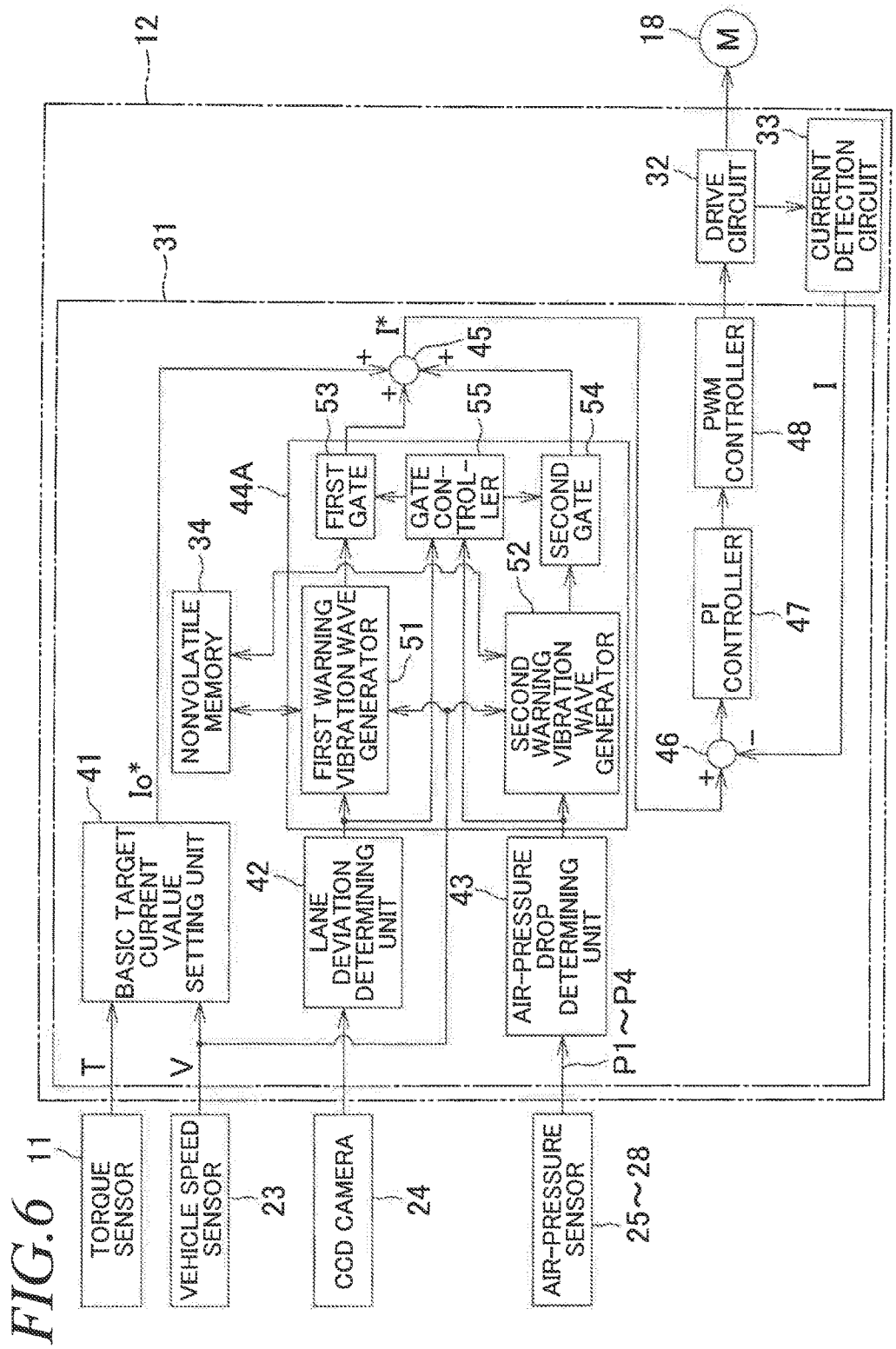
FIG. 6 is a block diagram illustrating another example of the electrical configuration of the ECU.

FIG. 6 is a block diagram illustrating another example of the electrical configuration of the ECU 12. In FIG. 6, components corresponding to those in FIG. 2 described above are denoted by the same numerals as in FIG. 2.

In the ECU 12 in FIG. 6, the configuration of the warning vibration wave generator 44A is different from that of the warning vibration wave generator 44 in FIG. 2.

The warning vibration wave generator 44A includes a first warning vibration wave generator 51, a second warning vibration wave generator 52, a first gate 53, a second gate 54, and a gate controller 55.

The first warning vibration wave generator 51 is the same as the first warning vibration wave generator 51 in FIG. 2. In other words, when the lane deviation determining unit 42 determines that the vehicle is highly likely to deviate from the lane, the first warning vibration wave generator 51 generates a first warning vibration wave Ie1 to warn the driver about this likelihood. In the present embodiment, the first warning vibration wave Ie1 is a sinusoidal signal having a frequency that varies with the vehicle speed V. Output of the first warning vibration wave generator 51 is provided to the first gate 53.

The second warning vibration wave generator 52 is the same as the second warning vibration wave generator 52 in FIG. 2. In other words, when the air-pressure drop determining unit 43 determines that the air pressure of at least one tire is lower than the threshold A, the second warning vibration wave generator 52 generates a second warning vibration wave Ie2 having a frequency that is different from that of the first warning vibration wave Ie1 to warn the driver about this air pressure. In the present embodiment, the second warning vibration wave Ie2 is a sinusoidal signal having a frequency that varies with the vehicle speed V. The frequency f2(V) of the second warning vibration wave Ie2 is set such that the frequency f2(V) of the second warning vibration wave Ie2 for a certain vehicle speed V is different from the frequency f1(V) of the first warning vibration wave Ie1 for this vehicle speed V. Output of the second warning vibration wave generator 52 is provided to the second gate 54.

Based on the determination result of the lane deviation determining unit 42 and the determination result of the air-pressure drop determining unit 43, the gate controller 55 controls the first gate 53 and the second gate 54. Hereinafter, the condition that the lane deviation determining unit 42 determines that the vehicle is highly likely to deviate from the lane and the air-pressure drop determining unit 43 determines that the air pressure of at least one tire is lower than the threshold A is referred to as "first determined condition", and the condition other than the first determined condition is referred to as "second determined condition".

Under the second determined condition, the gate controller 55 opens the first gate 53 and the second gate 54. Thus, under the second determined condition, the output of the first warning vibration wave generator 51 is provided to the vibration wave adding unit 45 through the first gate 53, and the output of the second warning vibration wave generator 52 is provided to the vibration wave adding unit 45 through the second gate 54. Consequently, for example, when the lane deviation determining unit 42 determines that the vehicle is highly likely to deviate from the lane while the air-pressure drop determining unit 43 determines that the air pressures of all tires are equal to or higher than the threshold A, the first warning vibration wave Ie1 generated by the first warning vibration wave generator 51 is provided to the vibration wave adding unit 45 through the first gate 53.

When the air-pressure drop determining unit 43 determines that the air pressure of at least one tire is lower than the threshold A while the lane deviation determining unit 42 does not determine that the vehicle is highly likely to deviate from the lane, the second warning vibration wave Ie2 generated by the second warning vibration wave generator 52 is provided to the vibration wave adding unit 45 through the second gate 54.

Under the first determined condition, the first warning vibration wave Ie1 is generated by the first warning vibration wave generator 51, and the second warning vibration wave Ie2 is generated by the second warning vibration wave generator 52. Under the first determined condition, the gate controller 55 closes the first gate 53 and the second gate 54 alternately. In other words, under the first determined condition, the gate controller 55 opens the first gate 53 and the second gate 54 alternately. The duration for which the first gate 53 is open (duration for which the second gate 54 is closed) and the duration for which the second gate 54 is open (duration for which the first gate 53 is closed) may be set to be the same, or may be set to be different. Specifically, under the first determined condition, the first warning vibration wave Ie1 and the second warning vibration wave Ie2 are alternately (cyclically) output in a time-divided manner so as not to overlap temporally. The first warning vibration wave Ie1 and the second warning vibration wave Ie2 may be generated at the same time, or may be generated at different times. In this case also, the driver can recognize that the vehicle is highly likely to deviate from the lane, and can also recognize that the tire air pressure is low.

Although one embodiment of the present invention has been described above, the present invention may be implemented in other embodiments. For example, in the above embodiment, the case has been described in which the warning vibration is applied for two vehicle conditions, the vehicle highly likely to deviate from the lane and low tire air pressure. However, the present invention may be applied also to the case in which the warning vibration is applied for three or more vehicle conditions. In this case as well, a warning vibration wave having a frequency that varies with the vehicle speed can be generated for each vehicle condition. Herein, the frequencies of the warning vibration waves for the corresponding vehicle conditions are set to be different from each other at the same vehicle speed.

The vehicle conditions for which the warning vibration is applied may be any vehicle conditions about which the driver needs to be warned. Examples thereof include, in addition to the vehicle conditions described above, a condition immediately before the time when the brake is applied in response to a detection of an obstacle or other objects, a condition that the amount of fuel such as gasoline falls to or below a predetermined value, and a condition that a fuel lid is open during traveling.

In addition, various design changes may be made within the scope of the matters described in the claims.

What is claimed is:

1. A warning device for a vehicle comprising:
    an electric motor that applies steering assisting force to a steering operation mechanism of a vehicle;
    a vehicle speed detector that detects a vehicle speed;
    a torque detector that detects a steering torque;
    a basic assist current value setting unit that sets a basic assist current value based on the steering torque detected by the torque detector;
    a vibration wave generator that generates, for each of a plurality of vehicle conditions, a warning vibration wave having a frequency that varies with the vehicle speed detected by the vehicle speed detector, the frequency at an identical vehicle speed being different for each vehicle condition;
    a target current value computing unit that computes a target current value for the electric motor by adding the warning vibration wave generated by the vibration wave generator to the basic assist current value set by the basic assist current value setting unit; and
    a motor controller that controls the electric motor based on the target current value computed by the target current value computing unit.

2. The warning device for a vehicle according to claim 1, wherein
    the vibration wave generator includes a time-division output unit that, when two or more vehicle conditions among the plurality of vehicle conditions have simultaneously arisen, outputs two or more warning vibration waves corresponding to each of the vehicle conditions individually in a time-division manner such that the output warning vibration waves do not overlap temporally.

* * * * *